United States Patent
Haik-Beraud et al.

(10) Patent No.: US 8,888,873 B2
(45) Date of Patent: Nov. 18, 2014

(54) PROCESS AND APPARATUS FOR GENERATING AND PURIFYING A SYNGAS

(75) Inventors: Natacha Haik-Beraud, Champigny-sur-Marne (FR); Antoine Hernandez, Chatenay Malabry (FR); Pascal Marty, Bry sur Marne (FR); Bernd Polster, Frankfurt am Main (DE)

(73) Assignee: L'air Liquide, Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 959 days.

(21) Appl. No.: 13/056,024

(22) PCT Filed: Jul. 23, 2009

(86) PCT No.: PCT/FR2009/051485
§ 371 (c)(1),
(2), (4) Date: Jan. 26, 2011

(87) PCT Pub. No.: WO2010/015767
PCT Pub. Date: Feb. 11, 2010

(65) Prior Publication Data
US 2011/0126459 A1      Jun. 2, 2011

(30) Foreign Application Priority Data
Aug. 4, 2008 (FR) ..................... 08 55397

(51) Int. Cl.
*B01J 7/00* (2006.01)

(52) U.S. Cl.
USPC ............ 48/61; 48/197 R; 48/127.1; 48/127.9; 48/128; 422/187; 422/188; 422/625; 422/630; 423/210; 423/220; 423/648.1; 423/651; 252/373

(58) Field of Classification Search
USPC ................ 48/61, 197 R, 127.1, 127.9, 128; 422/187–188, 625, 630; 423/210, 220, 423/648.1, 651; 252/373
See application file for complete search history.

(56) References Cited

U.S. PATENT DOCUMENTS

| | | | |
|---|---|---|---|
| 5,669,960 A | 9/1997 | Couche | |
| 7,731,923 B2 | 6/2010 | Marty et al. | |
| 2007/0245630 A1 | 10/2007 | Klein et al. | |
| 2008/0272340 A1 | 11/2008 | Koh | |
| 2008/0308769 A1* | 12/2008 | Marty et al. | .................. 252/373 |

FOREIGN PATENT DOCUMENTS

| | | |
|---|---|---|
| FR | 2881417 | 8/2006 |
| WO | WO 2007000545 | 1/2007 |

OTHER PUBLICATIONS

Search Report for PCT/FR2009/051485.
Kerry, Frank, G., "Industrial Gas Handbook", 2007, p. 238, CRC Press, Taylor & Francis Group, Boca Raton, FL.
Notice of Opposition to a European Patent European Patent No. EP2310314 (Application No. EP09740373.7), filed Nov. 12, 2012.

* cited by examiner

*Primary Examiner* — Kaity V. Handal
(74) *Attorney, Agent, or Firm* — Justin K. Murray

(57) ABSTRACT

A method for generating and purifying syngas and to an apparatus for generating and purifying syngas is presented.

10 Claims, 1 Drawing Sheet

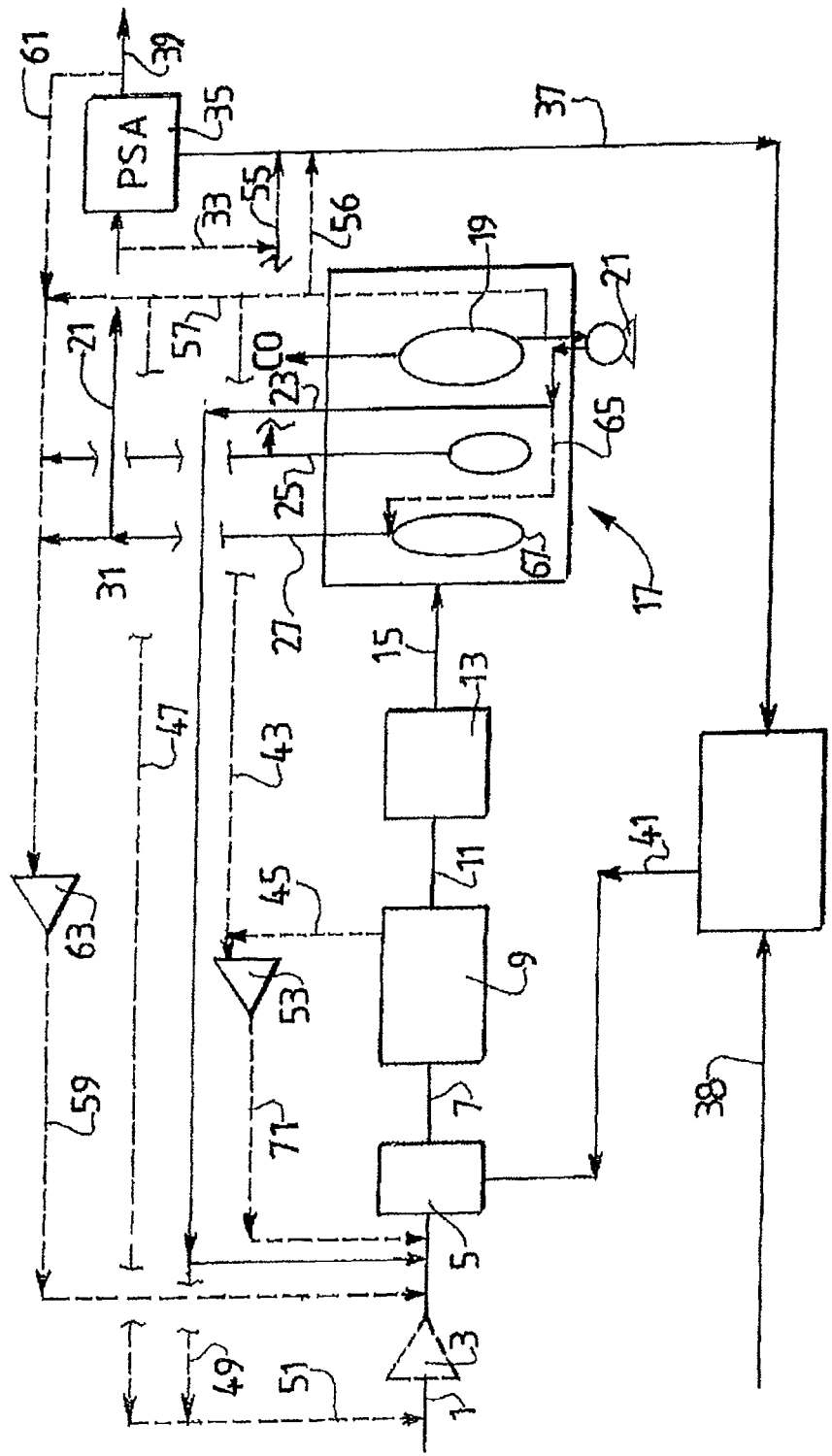

PROCESS AND APPARATUS FOR GENERATING AND PURIFYING A SYNGAS

This application is a §371 of International PCT Application PCT/FR2009/051485, filed Jul. 23, 2009.

FIELD OF THE INVENTION

The present invention relates to a method for generating and purifying syngas and to an apparatus for generating and purifying syngas.

BACKGROUND

Units producing carbon monoxide and hydrogen can be divided into two parts:
syngas generation (mixture containing $H_2$, CO, $CH_4$, $CO_2$, Ar, $H_2O$ and $N_2$ essentially).
syngas purification. This comprises:
a liquid solvent scrubbing unit to remove most of the sour gases contained in the syngas
an adsorbent bed purification unit
a cryogenic separation unit called cold box for producing CO.

In general, fuel is consumed in order to preheat the feed, and to superheat the steam, which may be consumed by the process and/or exported.

The quantity of fuel required is generally defined by the needs of the syngas generating unit.

Since the fuel consists of the waste gases from the separation unit (such as cold box CO, $H_2$ PSA, membranes, etc.), it is generally desirable to have an external fuel make-up to ensure the control of the fuel balance imposed by the process.

In the case in which the quantity of waste gases exceeds the fuel needs of the plant, the surplus can be burned in a boiler to produce steam, or can be exported. In the case of steam production, this generally incurs the investment of a dedicated boiler.

SUMMARY OF THE INVENTION

The invention proposes to recycle the waste methane produced by the syngas cryogenic separation unit as feed for the syngas production unit, in order to utilize it otherwise than as fuel, and thereby reduce the quantity of fuel available and also reduce the consumption of the feed (hydrocarbons). This avoids the investment in the ancillary boiler (conversion of surplus fuel to steam). Moreover, the steam optionally produced in the ancillary boiler cannot always be utilized.

According to one object of the invention, a method is provided for generating and purifying a syngas, in which a syngas containing hydrogen, carbon monoxide and methane is generated in a generating unit fed with a feed gas and a fuel, the syngas is purified in a separation unit to produce at least one fluid enriched either with carbon monoxide or with hydrogen and at least one methane-enriched fluid, the methane-enriched fluid is pressurized after being mixed with at least one other process fluid, and at least part of the mixture is sent to the generating unit, characterized in that at least one other fluid is the feed gas or a hydrogen-rich gas bypassed from the separation unit.

Optionally:
the syngas is purified in a cryogenic separation unit, the methane-enriched fluid is pressurized by pumping a methane-enriched liquid from the cryogenic separation unit, at least part of the pumped liquid is vaporized and sent to the generating unit;
the methane-enriched fluid is mixed with another fluid bypassed from a unit downstream of the generating unit to produce a gas mixture, the gas mixture is compressed in a compressor and the mixture is sent to the generating unit;
the hydrogen-rich gas is produced by an adsorption unit supplied with a fluid originating from the cryogenic separation unit;
the methane-enriched fluid is mixed with the feed gas of the generating unit to produce a gas mixture, the gas mixture is compressed in a compressor and the mixture is sent to the generating unit.

According to a further object of the invention, an apparatus is provided for generating and purifying a syngas, comprising a generating unit supplied with a feed gas and a fuel, a separation unit for producing at least one fluid enriched either with carbon monoxide or with hydrogen and at least one methane-enriched fluid, means for sending a syngas containing hydrogen, carbon monoxide and methane from the generating unit to the separation unit, means for pressurizing a mixture consisting of the methane-enriched fluid and at least one other fluid from the apparatus, and means for sending at least part of the mixture to the generating unit, characterized in that the mixture pressurizing means are connected to an intake of feed gas or an intake of hydrogen-rich gas bypassed from the separation unit.

According to other optional objects:
the separation unit is a cryogenic separation unit, the pressurizing means consist of a pump and comprise means for vaporizing part of the pumped liquid and for sending it to the generating unit, and optionally means for sending another part of the pumped liquid to a column of the cryogenic separation unit;
the apparatus comprises a compressor, means for sending the gas mixture to the compressor to form a compressed gas mixture, and means for sending the compressed gas mixture to the generating unit;
the apparatus comprises a compressor, means for mixing at least part of the feed gas with the methane-enriched fluid to form a gas mixture, means for sending the gas mixture to the compressor, and means for sending the compressed gas mixture to the generating unit;
the mixture pressurizing means are connected to an intake of hydrogen-rich gas bypassed from the separation unit;
the apparatus comprises means for withdrawing a hydrogen-rich gas from a stripping column of the separation unit as hydrogen-rich gas;
the apparatus comprises means for purifying a gas originating from the separation unit to supply the hydrogen-rich gas;
the apparatus comprises means for withdrawing the hydrogen-rich gas;
the separation unit is a cryogenic distillation unit.

Various solutions are available for recycling the waste methane as feed to the syngas generating unit:

a) Recycle by cryogenic pumps. The waste methane withdrawn from the bottom of the $CO/CH_4$ column of the cold box is pumped, and then vaporized and heated in the heat exchange line before being recycled as feed to the syngas generating unit. These pumps may be dedicated recycle pumps or may be common with the pumps used for methane scrubbing.

b) Recycle by $CH_4$ compressor. The waste methane withdrawn at low pressure from the $CO/CH_4$ column of the cold box is vaporized and heated in the heat exchange line and then compressed by a dedicated compressor to be recycled as feed.

c) Recycle by common compressor with flash gas.

d) Recycle by common compressor with the hydrogen-rich gas at the outlet of the cold box, which serves as hydrogen for hydrogenating the natural gas feed. In this case, the mixture is recycled upstream of the hydrodesulfurization unit.

e) Recycle by common compressor with the pure hydrogen leaving the PSA which serves as hydrogen for hydrogenating the natural gas feed. In this case, the mixture is recycled upstream of the hydrodesulfurization unit.

f) Recycle by common compressor with the $CO_2$ produced by the sour gas stripping unit.

g) Recycle by common compressor with the feed gas (the $CH_4$ recycle can optionally be pumped before being compressed).

h) Combination of the various solutions (e.g. 3 and 6, 7 and 3, etc.).

BRIEF DESCRIPTION OF THE FIGURES

FIG. 1 illustrates one embodiment of the present invention.

The invention will now be described in greater detail with reference to FIG. 1. For the sake of brevity, this FIGURE shows a series of different solutions covered by the invention. The use of a single one of these solutions may suffice.

DETAILED DESCRIPTION OF THE INVENTION

For a further understanding of the nature and objects for the present invention, reference should be made to the detailed description, taken in conjunction with the accompanying drawing, in which like elements are given the same or analogous reference numbers and wherein:

A feed gas stream 1 is sent to a syngas 7 generating unit 5, for example of the SMR, ATR type, etc., optionally after compression in a compressor 3. This unit is supplied with fuel 41 whereof a part 38 may originate from an external source and another part 37 may originate from the syngas treatments downstream of the generating unit 5.

The syngas 7 is optionally sent to a sour gas stripping unit 9 which may produce a carbon dioxide-rich gas 45. The syngas optionally stripped of sour gases 11 is sent to adsorbers 13 to be dried and purified, and the gas formed 15 is fed to a cryogenic distillation separation unit 17. The separation unit 17 is shown highly schematically but may be a methane scrubbing unit comprising a methane scrubbing column 67, a stripping column and a $CO/CH_4$ separation column 19. An example of a unit of this type, but using only two columns, is described in "Industrial Gas Handbook" by F. Kerry, page 238. A methane-rich liquid can be withdrawn from the bottom of the column 19, pressurized in a pump 21 (which may be the pump for sending methane 65 to the methane scrubbing column 67), vaporized to form a gas stream 23 and withdrawn from the cold box of the separation unit 17.

This stream 23 can be recycled to the generating unit 5 in various ways. It can be sent directly to the unit 5 without compression. If not, as stream 49, it can be mixed with the feed gas 1 and compressed with said gas in the compressor 3 supplying the generating unit 5.

It is also possible to withdraw the methane-rich liquid from the bottom of the column 19, to vaporize it without pressurizing it, and to withdraw it as stream 57. This stream can be mixed with another fluid to form a mixture, the mixture being compressed in a compressor and sent to the generating unit 5 as feed gas. For example, the compressor 63 compresses a mixture of methane-rich gas 57 and at least one of the following gases: a hydrogen-rich gas 25, 27, 31 originating from the separation unit, in particular from the methane scrubbing column 67 and/or the stripping column, a hydrogen-rich gas produced by an adsorption unit 35 supplied with a hydrogen-rich gas 29 originating from the separation unit 17. The mixture 59 produced in the compressor 63 is recycled upstream of the generating unit. In another embodiment, compressor 3 compresses a mixture 51, which includes a portion 47 of methane-rich gas 57, stream 49 and feed gas before being supplied to the generating unit 5.

Another alternative is to use the compressor 53 to compress a mixture of methane-rich gas 43 and at least one of the following gases: a carbon dioxide-rich gas originating from the sour gas stripping unit. The mixture 71 formed is sent to the generating unit 5 as feed.

The adsorption unit 35, preferably a PSA unit, is fed with the gas 29 originating from the separation unit 17 and produces a hydrogen-rich product 39, optionally a recycle gas 61 and optionally a fuel gas 37 (optionally mixed with part 33, 55 of the gas originating from the separation unit 17).

It should be understood that for the versions in which the methane-rich fluid is compressed otherwise than by a pump, the separation unit 17 may be a unit operating otherwise than by cryogenic distillation, for example by permeation or by adsorption.

In conclusion, the methane-rich fluid may be pressurized:

i) either by pumping optionally in a pump which also pumps a methane-rich fluid which is not intended to be sent to the generating unit, but for example to the methane scrubbing column of a cryogenic unit;

ii) or by compression with a gas to be recycled to the generating unit and originating from a treatment unit downstream of the generating unit and/or with the feed gas of the generating unit.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. An apparatus for generating and purifying a syngas, comprising
    a generating unit supplied with a feed gas and a fuel,
    a separation unit for producing at least one fluid enriched either with carbon monoxide or with hydrogen and at least one methane-enriched fluid,
    a means for sending a syngas containing hydrogen, carbon monoxide and methane from the generating unit to the separation unit,
    a means for pressurizing a mixture consisting of the methane-enriched fluid and at least one other fluid from the apparatus, and
    a means for sending at least part of the mixture to the generating unit,
    wherein the mixture pressurizing means are connected to an intake of feed gas or an intake of hydrogen-rich gas bypassed from the separation unit.

2. The apparatus of claim 1, wherein the separation unit is a cryogenic separation unit, the pressurizing means consist of a pump and comprise means for vaporizing a first part of a pumped liquid and for sending the first part of the pumped liquid to the generating unit.

3. The apparatus of claim 2, further comprising a means for sending a second part of the pumped liquid to a column of the cryogenic separation unit.

4. The apparatus of claim 1, further comprising a compressor, a means for sending the gas mixture to the compressor to form a compressed gas mixture, and a means for sending the compressed gas mixture to the generating unit.

5. The apparatus of claim 4, comprising a compressor, a means for mixing at least part of the feed gas with the methane-enriched fluid to form a gas mixture, a means for sending the gas mixture to the compressor, and a means for sending the compressed gas mixture to the generating unit.

6. The apparatus of claim 1, wherein the mixture pressurizing means are connected to an intake of hydrogen-rich gas bypassed from the separation unit.

7. The apparatus of claim 6, further comprising a means for withdrawing a hydrogen-rich gas from a stripping column of the separation unit as hydrogen-rich gas.

8. The apparatus of claim 6, further comprising a means for purifying a gas originating from the separation unit to supply the hydrogen-rich gas.

9. The apparatus of claim 6, further comprising a means for withdrawing the hydrogen-rich gas.

10. The apparatus of claim 1, wherein the separation unit is a cryogenic distillation unit.

* * * * *

UNITED STATES PATENT AND TRADEMARK OFFICE
CERTIFICATE OF CORRECTION

PATENT NO. : 8,888,873 B2  
APPLICATION NO. : 13/056024  
DATED : November 18, 2014  
INVENTOR(S) : Haik-Beraud et al.

Page 1 of 1

It is certified that error appears in the above-identified patent and that said Letters Patent is hereby corrected as shown below:

On the Title Page, Item (57) ABSTRACT

Delete: "A method for generating and purifying syngas and to an apparatus for generating and purifying syngas is presented."

Insert: --In a process for generating and purifying a syngas, a syngas containing hydrogen, carbon monoxide and methane is generated in a generating unit supplied with a feed gas and a fuel, the syngas is purified in a separation unit, in order to produce at least one fluid enriched either with carbon monoxide or with hydrogen, and at least one methane enriched fluid, the methane-enriched fluid is pressurized after it has been mixed with the feed gas or with a hydrogen-rich gas of the process, and at least one portion of the mixture is sent to the generating unit.--

Signed and Sealed this
Twenty-first Day of April, 2015

Michelle K. Lee
*Director of the United States Patent and Trademark Office*